United States Patent
Heyl

(10) Patent No.: US 8,543,311 B2
(45) Date of Patent: Sep. 24, 2013

(54) METHOD AND DEVICE FOR CONTROLLING A DRIVE TRAIN

(75) Inventor: Andreas Heyl, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 13/133,684

(22) PCT Filed: Nov. 25, 2009

(86) PCT No.: PCT/EP2009/065824
§ 371 (c)(1),
(2), (4) Date: Jun. 9, 2011

(87) PCT Pub. No.: WO2010/066581
PCT Pub. Date: Jun. 17, 2010

(65) Prior Publication Data
US 2011/0264341 A1      Oct. 27, 2011

(30) Foreign Application Priority Data

Dec. 9, 2008   (DE) .......................... 10 2008 054 424

(51) Int. Cl.
*B60L 3/08* (2006.01)
*B60L 3/00* (2006.01)
*B60L 15/20* (2006.01)
*B60W 10/08* (2006.01)

(52) U.S. Cl.
CPC ............... *B60L 3/0061* (2013.01); *B60L 15/20* (2013.01); *B60W 10/08* (2013.01); *B60L 2240/423* (2013.01); *B60W 2510/083* (2013.01); *B60W 2710/083* (2013.01)
USPC ................... 701/97; 701/53; 701/66

(58) Field of Classification Search
USPC ............................. 701/53, 54, 66, 70, 71, 82
See application file for complete search history.

(56) References Cited

U.S. PATENT DOCUMENTS

| | | | |
|---|---|---|---|
| 5,650,700 A | 7/1997 | Mutoh et al. | |
| 7,853,388 B2 * | 12/2010 | Wang | 701/81 |
| 7,988,593 B2 * | 8/2011 | Staub et al. | 477/3 |

FOREIGN PATENT DOCUMENTS

| | | |
|---|---|---|
| DE | 19851457 A1 | 2/2000 |
| EP | 0 900 711 A2 | 3/1999 |
| JP | 57-186902 A | 11/1982 |
| JP | 63-11434 A | 1/1988 |
| JP | 2006-27545 A | 2/2006 |
| JP | 2006-87175 A | 3/2006 |
| JP | 2009-118675 A | 5/2009 |
| KR | 2003-0037637 A | 5/2003 |

* cited by examiner

*Primary Examiner* — James Trammell
*Assistant Examiner* — Todd Melton
(74) *Attorney, Agent, or Firm* — Maginot, Moore & Beck

(57) ABSTRACT

A method for controlling a drive train with at least one drive unit, in particular for a vehicle is disclosed. A setpoint value for a torque of the at least one drive unit can be predefined. The actual value of this torque is detected and a first signal is generated which ensures reliable operation of the drive train if the deviation of the actual value from the setpoint value is greater than a predefinable absolute value of the deviation value and/or the deviation of the actual value from the setpoint value lasts for longer than a predefinable absolute value of the deviation time period.

9 Claims, 3 Drawing Sheets

METHOD AND DEVICE FOR CONTROLLING A DRIVE TRAIN

This application is a 35 U.S.C. §371 National Stage Application of PCT/EP2009/065824, filed Nov. 25, 2009, which claims the benefit of priority to Serial No. 10 2008 054 424.8, filed Dec. 9, 2008 in Germany, the disclosures of which are incorporated herein by reference in their entirety.

BACKGROUND

The disclosure relates to a method and a device for controlling a drive train. A method and a device for controlling a drive train are known from DE 198 51 457. In said document, a method and a device for controlling the torque of a drive unit are proposed. A setpoint value for a torque of the drive unit is formed at least on the basis of the position of an operator control element which can be activated by the driver. In addition, an actual value for the torque is acquired and at least one control variable for the torque of the drive unit is formed as a function of the setpoint value. A signal is generated as a function of the deviation between the setpoint value and the actual value, by means of which signal the control variable is reduced if the actual value exceeds the setpoint value.

Guide ECE R100 for battery-operated electric vehicles requires that a fault (for example in the engine control device) in a standing unbraked vehicle must not lead to a movement >10 cm. (Cf. Section 5.2.2.3: unintentional acceleration, deceleration and reversal of the drive train shall be prevented. In particular, a failure (for example in the drive power system) shall not cause more than 0.1 m movement of a standing unbraked vehicle).

Electric motors are monitored for undesired torque. As soon as a fault is detected, the electric motor goes into its safe state in which it can no longer provide a positive torque. In order to prevent an undesired movement, very short fault reaction times are necessary. These are very difficult to implement and lead to a reduction in the availability. Known concepts operate with fault times of 500 ms. However, electric motors already provide their maximum torque at low rotational speeds, with the result that a corresponding fault can lead to a movement of several meters depending on the vehicle. A reduction in the fault times is possible, but runs up against technical limits under certain circumstances. A known concept is based on monitoring the functional computer by means of a monitoring module in which an enquiry/response communication is carried out between these components. The time between an enquiry and a response cannot be reduced further owing to the sequencing of the software modules in the functional computer (often >10 ms). Even if the times are reduced, this can have negative consequences for the availability of the system since faults are debounced for a shorter time and lead more quickly to switching off. Even with short fault reaction times, an unbraked vehicle will probably roll for more than 10 cm after a "torque shock" on a precipitous road.

SUMMARY

The method and the device according to the disclosure for controlling a drive train having at least one drive assembly, in particular for a vehicle, wherein a setpoint value for a torque of the at least one drive assembly can be predefined and an actual value of the torque is acquired, is characterized in that a first signal is generated which ensures reliable operation of the drive train if the deviation of the actual value from the setpoint value is greater than a predefinable absolute value of the deviation value and/or the deviation of the actual value from the setpoint value lasts for a longer time than a predefinable absolute value of the deviation time period. The technical background is that a deviation of the setpoint functionality of the drive assembly can be detected and a signal is generated in reaction thereto. This signal serves itself for implementing measures, or as a trigger for implementing measures, which ensure reliable operation of the drive train. Reliable operation of the drive train is understood here to mean that, in particular, the external effects of the drive train, that is to say for example the acting torque at the driven wheels, correspond either to the setpoint functionality or else are changed into an operationally safe state. For example, in the case of a braked vehicle, in particular the stationary state of the driven wheels, is to be understood as an operationally safe state of the drive train. Another example of an operationally safe state is an active, in particular lower, short circuit of the electric motor. In this context, the lower half bridge of the power supply of the electric motor is short-circuited and the upper bridge remains open. The electric motor therefore outputs a low negative torque. By applying the specified examples, a drive train is therefore advantageously provided whose external effect either corresponds to a predefined setpoint functionality or assumes an operationally safe state.

One development of the disclosure provides that when a predefinable rotational speed of a rotating output component, in particular of at least one driven wheel of a vehicle, is undershot, the absolute value of the predefinable deviation value and/or of the predefinable deviation time period is smaller. The technical background is that then even when there is a relatively small deviation of the setpoint functionality of the drive assembly, a signal is generated which ensures reliable operation of the drive train. Therefore, in situations in which even a small deviation of the setpoint functionality of the drive train leads to undesired effects, rapid intervention of the method and of the device can advantageously take place and reliable operation of the drive train can be ensured. Therefore, a fault reaction is triggered in particular when an undesired torque is detected when the vehicle is stationary. In particular when the vehicle is stationary, the monitoring changes into a more sensitive mode, with relatively short fault tolerance times and relatively narrow torque limits. When a fault is detected, a braking function is activated, for example active braking by means of an electric brake or activation of a gear lock or braking by means of a double clutch mechanism by closing both clutches. In this state, there is no longer any hazard due to undesired movement.

A further development provides that the drive train has at least one brake device and the generated first signal activates a braking function. The technical background is that the brake device can counteract a torque of the at least one drive assembly of the drive train. If the deviation of the actual value from the setpoint value of the torque is greater than a predefinable absolute value of the deviation value and/or the deviation of the actual value from the setpoint value lasts for a longer time than a predefinable absolute value of the deviation time period, a signal is generated which activates a braking function. The brake device counteracts the torque of the drive assembly. The drive train is therefore advantageously placed in a safe state. Therefore, not only can the torque of the drive assembly be reduced but also the vehicle is actively braked by other systems. Therefore, the vehicle is prevented from rolling away by, in particular, inertia of the vehicle and/or stored energy in the drive train (for example torque converters in automatic transmissions).

One development of the disclosure is characterized in that during the activated braking function a setpoint value for a torque of a drive assembly can be predefined and an actual value of the torque is acquired. If the deviation of the actual value from the setpoint value is smaller than a predefinable absolute value of the deviation value and/or the deviation of the actual value from the setpoint value lasts for a shorter time than a predefinable absolute value of the deviation time period, a second signal is generated. This signal deactivates the braking function. If, on the other hand, the deviation of the actual value from the setpoint value is greater than a predefinable absolute value of the deviation value and/or the deviation of the actual value from the setpoint value lasts for a longer time than a predefinable absolute value of the deviation time period, a third signal is generated. This ensures that the drive assembly no longer outputs any torque. The technical background is that after the activation of the brake device the setpoint functionality of the drive assembly is checked once more. If the deviation of the actual value from the setpoint value of the torque of the drive assembly is smaller than a predefinable absolute value of the deviation value and/or the deviation of the actual value from the setpoint value lasts for a shorter time than a predefinable absolute value of the deviation time period, the braking function is deactivated. This means that there is no longer any significant deviation of the actual value of the torque from the setpoint value. The setpoint functionality of the drive assembly is restored, and in particular the drive train can therefore be controlled again. As a result of this, the braking function is deactivated and the drive train is actuated normally again. On the other hand, if, after activation of the braking function, the deviation of the actual value from the setpoint value is nevertheless greater than a predefinable absolute value of the deviation value and/or the deviation of the actual value from the setpoint value lasts for a longer time than a predefinable absolute value of the deviation time period, a third signal is generated. This signal ensures that the drive assembly no longer outputs any torque. This can be implemented, in particular, by virtue of the fact that, for example, the power supply to the drive assembly is interrupted, by, for example, continuously disconnecting the electrical power supply of the drive assembly, stopping the fuel supply, no longer applying any voltage to the drive assembly and/or no longer outputting any pulse-controlled inverter signals. Alternatively, the drive assembly can be actively braked or the driven wheels are disconnected mechanically by opening a clutch or disconnecting a gearspeed of the transmission from the drive train.

This functionality advantageously provides the possibility of checking the malfunctioning of the drive train a further time in an operationally safe state. If the malfunctioning no longer occurs, the braking function is deactivated and the drive train is actuated normally again. If the malfunctioning continues to occur, the drive assembly is placed in a state in which it can no longer output any torque. Instead of switching off the electric motor irreversibly (until the next ignition off/on process), the control device checks, with the drive train securely locked, whether the torque-related fault continues to be present. If this is not the case, an immediate restart can be permitted, in particular after a message to the driver. As a result, the number of irreversible switching off processes can be reduced and the availability can be increased.

One development of the disclosure provides that during the activated braking function a warning message is output and a means for deactivating the braking function is provided which can generate a second signal. This second signal deactivates the braking function. The technical background of this embodiment is that an operator is provided with the possibility of influencing the method. Accordingly, when the brake device is activated a warning message is output which indicates to the operator the malfunctioning and possibly the hazards resulting therefrom. If the operator would like to continue to actuate the drive train, a means is provided with which the operator can actively deactivate the braking function. In particular, by activating the means a second signal is generated which deactivates the braking function. A possibility of overriding the automatic function of the controller is therefore advantageously provided. Instead of switching off the electric motor, a warning is issued to the driver that a movement may take place when the brake is deactivated (for example by means of brief activation of the accelerator pedal). The driver's ability to control the fault is therefore increased. When the brake is deactivated (for example by means of activation of the accelerator pedal), the system changes from the stationary mode into an unbraked driving mode. An immediate restart can be permitted. As a result, the number of irreversible switching off processes can be reduced and the availability increased.

One development of the invention disclosure provides that the braking function activates a brake device, in particular an electric brake, a gear lock and/or both clutches of a clutch mechanism. The technical background of this development is that different brake devices can be used to achieve a braking effect which counteracts the torque of the drive assembly. Different brake devices can advantageously be used to achieve the braking functionality.

One development of the disclosure is characterized in that the warning message provides information about the defect which is present and the resulting hazards. The technical background and advantage of this development is that the operator is clearly informed which defect is present and which hazards can result therefrom. In a technical system, very different faults may occur with very different causes and effects. The possibility is therefore provided of enabling the operator to decide, as a function of this information, whether he would like to actively override or retain the automatic control of the drive train.

One development of the disclosure provides that an operator control element, in particular an accelerator pedal, is provided as a means for deactivating the braking function. The background and advantage of this embodiment of the disclosure is that a specific operator control element is provided with which the operator can deactivate the braking function. In particular, an accelerator pedal whose activation can, for example, enable the operator to inform the system that the further outputting of a torque by the drive assembly is desired, is suitable for this.

BRIEF DESCRIPTION OF THE DRAWINGS

The disclosure permits numerous embodiments. A number thereof will be explained in more detail on the basis of the figures illustrated in the drawings, in which.

DETAILED DESCRIPTION

Figure 1:
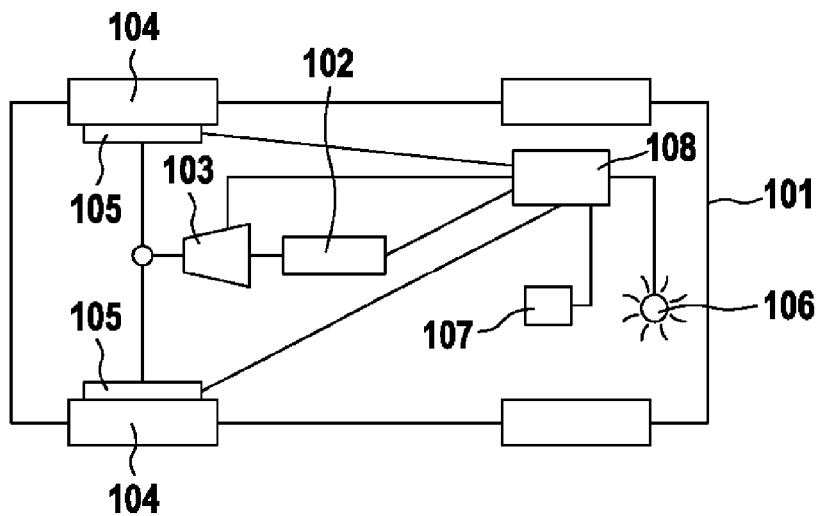
FIG. 1 shows a drive train for a vehicle.

FIG. 1 shows a vehicle 101 with a drive train. The vehicle has driven wheels 104 which are coupled mechanically to the drive assembly 102 and the transmission 103. Brake devices 105 are arranged on the driven wheels 104. A control device 108 can communicate with the components of the vehicle and of the drive train, in particular can exchange data and output signals to the components. The control device 108 can therefore actuate the brake devices 105, the transmission 103, the drive assembly 102 and the warning message output component 106, as well as receive signals from the operator control element 107 and the drive train components 102 to 105.

Figure 2:
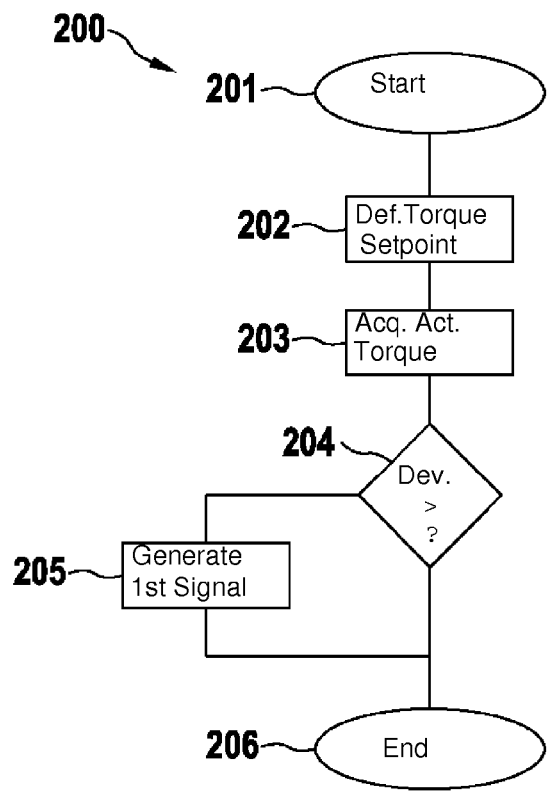
FIG. 2 shows a first schematic flowchart of an exemplary embodiment of the method according to the disclosure for controlling a drive train.

FIG. 2 shows a first schematic flowchart 200 of an exemplary embodiment of the method according to the disclosure for controlling a drive train. The method starts with step 201, and in step 202 a setpoint value for a torque of the at least one drive assembly 102 is predefined. The actual value of this torque is acquired in step 203. In step 204 it is checked whether the deviation of the actual value from the setpoint value is greater than a predefinable absolute value of the deviation value and/or the deviation of the actual value from the setpoint value is longer than a predefinable absolute value of the deviation time period. If this is not the case, the method ends with step 206. However, if the deviation is greater or longer than the respective predefinable absolute value, the method branches to step 205. In step 205, a first signal is generated which ensures reliable operation of the drive train. The method then ends with step 206.

Figure 3:
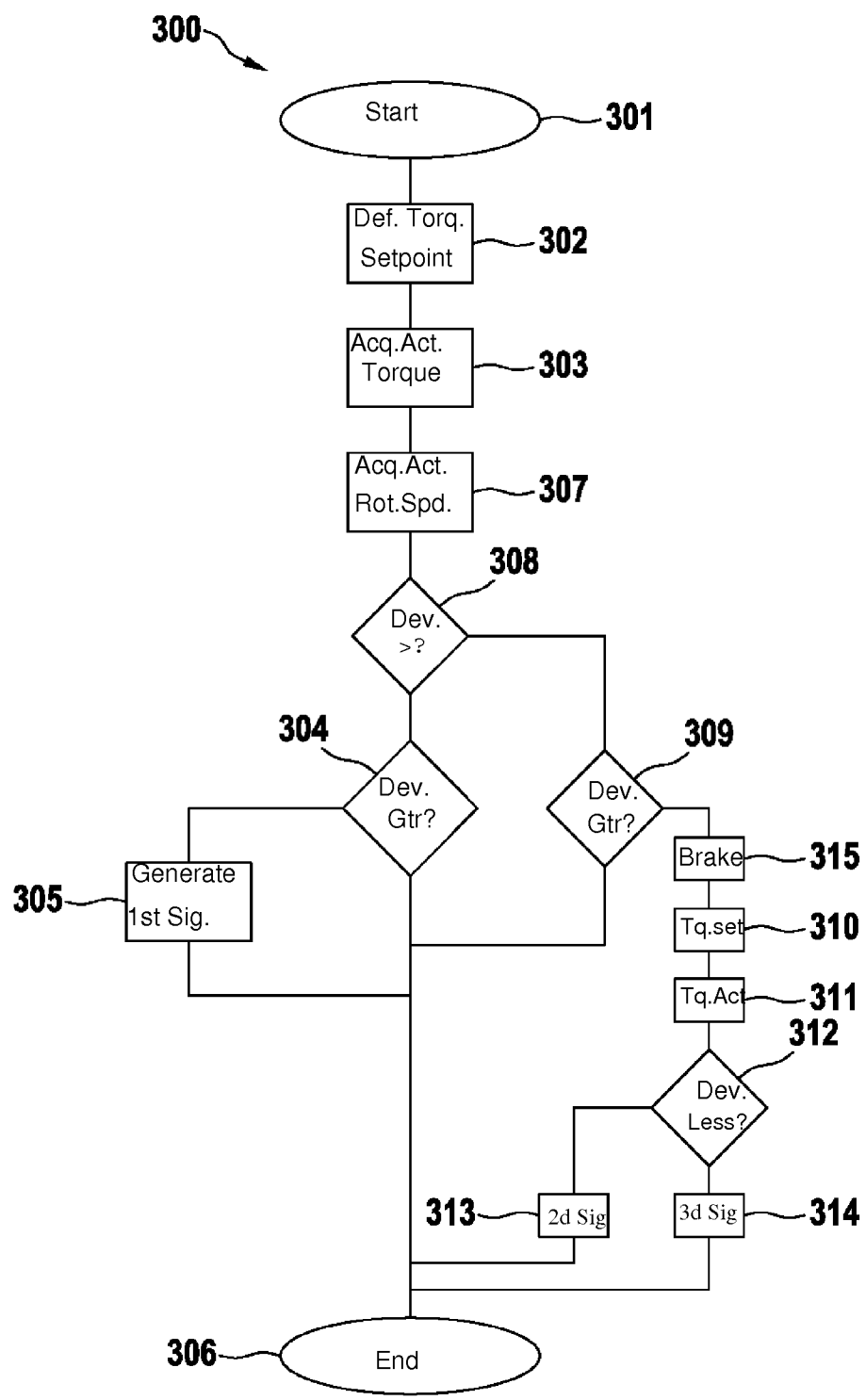
FIG. 3 shows a second schematic flowchart of an exemplary embodiment of the method according to the disclosure for controlling a drive train.

FIG. 3 shows a second schematic flowchart 300 of an exemplary embodiment of the method according to the disclosure for controlling a drive train. The method starts with step 301. In step 302, the setpoint value for a torque of the at least one drive assembly is predefined. The actual value of the torque is acquired in step 303. The rotational speed of a rotating output component is acquired in step 307. In step 308 it is checked whether the rotational speed of the rotating output component undershoots a predefinable rotational speed. If the predefinable rotational speed is not undershot, the method is continued with the steps 304, 305 and 306, in a way which is analogous to steps 204, 205 and 206. When the predefinable rotational speed is undershot in step 308, the method branches to step 309. It is checked there whether the deviation of the actual value from the setpoint value is greater than the relatively small predefinable absolute value of the deviation value and/or the deviation of the actual value from the setpoint value is longer than the predefinable relatively small absolute value of the deviation time period. If the deviation is not too large, the method ends with step 306. Otherwise the method continues with step 315. There a braking function is activated. In step 310, a setpoint value for a torque of the at least one drive assembly is in turn predefined, and in step 311 the actual value of the torque is acquired. Then, in step 312 it is checked whether the deviation of the actual value from the setpoint value is smaller than a predefinable absolute value of the deviation value and/or whether the deviation of the actual value from the setpoint value lasts for a shorter time than a predefinable absolute value of the deviation time period. If this is the case, in step 313 a second signal is generated which deactivates the braking function. Then, the method ends with step 306. If the check in step 312 leads to the result that the deviation of the actual value from the setpoint value is greater than a predefinable absolute value of the deviation value and/or the deviation of the actual value from the setpoint value lasts for a longer time than a predefinable absolute value of the deviation time period, therefore in step 314 a third signal is generated which ensures that the drive assembly no longer outputs any torque. The method ends with step 306.

Figure 4:
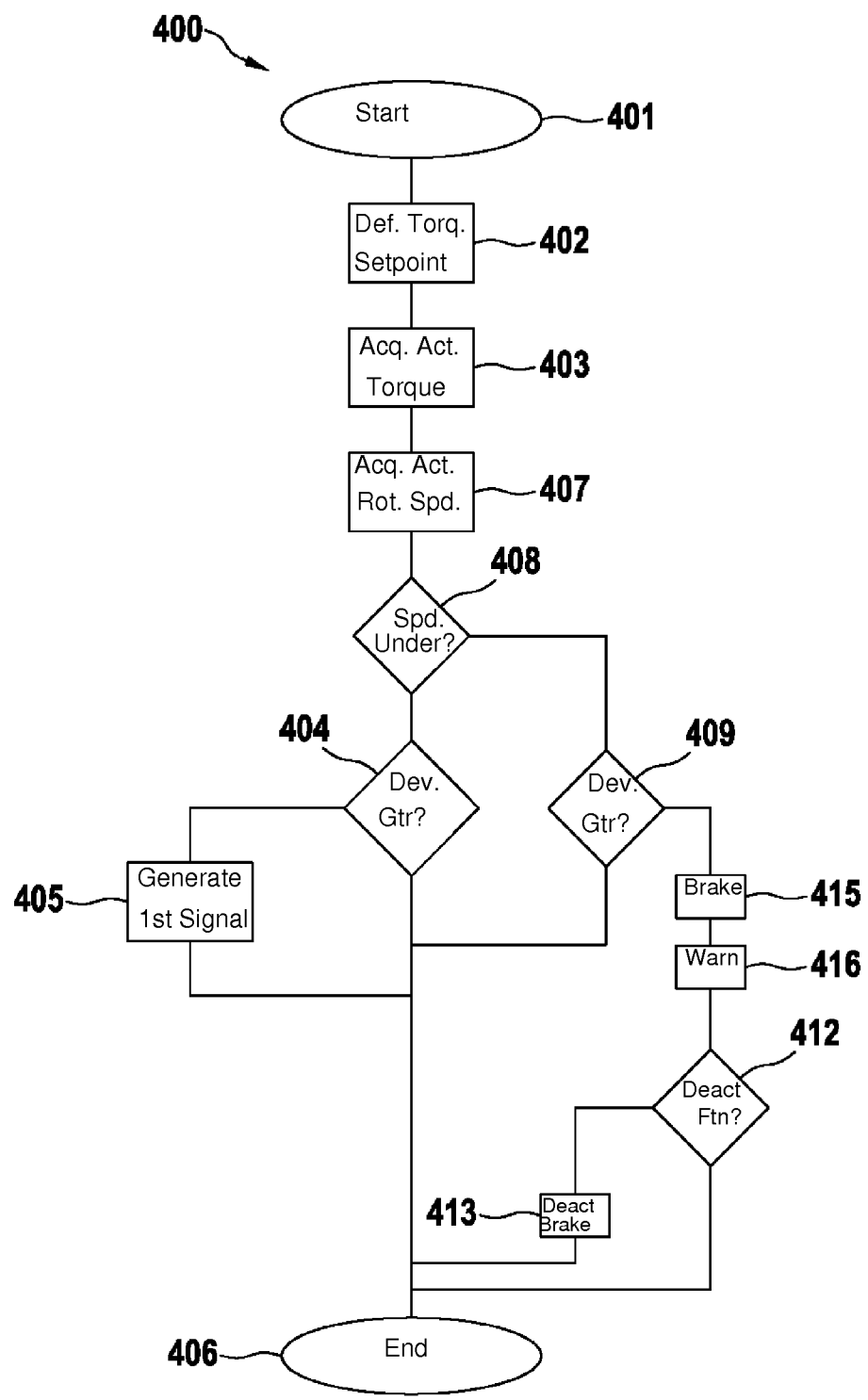
FIG. 4 shows a third schematic flowchart of an exemplary embodiment of the method according to the disclosure for controlling a drive train.

FIG. 4 shows a third schematic flowchart 400 of an exemplary embodiment of the method according to the disclosure for controlling a drive train. The method starts in step 401, and in step 402 a setpoint value for a torque of the at least one drive assembly is predefined. In step 403 the actual value of the torque is acquired. In step 407 the rotational speed of a rotating output component is acquired. In step 408 it is checked whether the rotational speed of the rotating output component undershoots a predefinable rotational speed. If this rotational speed is not undershot, the method branches to the steps 404 to 406, which are carried out in a way analogous to steps 204 to 206 and 304 to 306. If the rotational speed is undershot in step 408, the method branches to step 409. It is checked there whether the deviation of the actual value from the setpoint value is greater than a predefinable absolute value of the deviation value and/or the deviation of the actual value from the setpoint value lasts for a longer time than a predefinable absolute value of the deviation time period. If this is not the case, the method branches to step 406 with which the method ends. Otherwise the method branches to step 415 in which a braking function is activated. Then, in step 416 a warning message is output. In step 412 it is enquired whether a means for deactivating the braking function is activated. If this is the case, the method branches to step 413 in which the braking function is deactivated. Otherwise the method branches directly to step 406 in which the method ends.

The specified methods are always carried out repeatedly during the operation of the drive train.

The invention claimed is:

1. A method for controlling a drive train having at least one drive assembly, in particular for a vehicle, wherein a setpoint value for a torque of the at least one drive assembly can be predefined and an actual value of the torque is acquired, comprising:
   generating a first signal which ensures reliable operation of the drive train if one or more of (i) the deviation of the actual value from the setpoint value is greater than a predefinable absolute value of the deviation value and (ii) the deviation of the actual value from the setpoint value lasts for a longer time than a predefinable absolute value of the deviation time period.

2. The method as claimed in claim 1, wherein when a predefinable rotational speed of a rotating output component, in particular of at least one driven wheel of a vehicle, is undershot, one or more of the absolute value of the predefinable deviation value and of the predefinable deviation time period is smaller.

3. The method as claimed in claim 2, wherein the drive train has at least one brake device and the generated first signal activates a braking function.

4. The method as claimed in claim 3, wherein during the activated braking function a setpoint value for a torque of a drive assembly can be predefined and an actual value of the torque is acquired, and if one or more of (i) the deviation of the actual value from the setpoint value is smaller than a predefinable absolute value of the deviation value and (ii) the deviation of the actual value from the setpoint value lasts for a shorter time than a predefinable absolute value of the deviation time period, then a second signal is generated which deactivates the braking function, and if one or more of (i) the deviation of the actual value from the setpoint value is greater than a predefinable absolute value of the deviation value and (ii) the deviation of the actual value from the setpoint value lasts for a longer time than a predefinable absolute value of the deviation time period, then a third signal is generated which ensures that the drive assembly no longer outputs any torque.

5. The method as claimed in claim 3, wherein:
   during the activated braking function a warning message is output and a means for deactivating the braking function is provided which generates a second signal, and
   the second signal deactivates the braking function.

6. The method as claimed in claim 5, wherein the warning message provides information about the defect which is present and the resulting hazards.

7. The method as claimed in claim 5, wherein an operator control element, in particular an accelerator pedal, is provided as a means for deactivating the braking function.

8. The method as claimed in claim 3, wherein the braking function activates a brake device, in particular one or more of a brake, an electric brake, a gear lock and both clutches of a double clutch mechanism.

9. A device for controlling a drive train having at least one drive assembly, wherein a setpoint value for a torque of a drive assembly can be predefined and an actual value of the torque is acquired, comprising:
   a control device in communication with the drive train and configured to;
   detect a deviation between the actual value of the torque and the setpoint value; and
   generate a first signal provided to the drive train which ensures reliable operation of the drive train if one or more of (i) the deviation of the actual value from the setpoint value is greater than a predefinable absolute value of the deviation value and (ii) the deviation of the actual value from the setpoint value lasts for a longer time than a predefinable absolute value of the deviation time period.

* * * * *